(12) United States Patent
Jun et al.

(10) Patent No.: US 9,052,561 B2
(45) Date of Patent: Jun. 9, 2015

(54) ELECTROCHROMIC DEVICE

(71) Applicant: LG INNOTEK CO., LTD., Seoul (KR)

(72) Inventors: Sung Gon Jun, Seoul (KR); Hae Min Choe, Seoul (KR); Yun Ho Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 13/927,789

(22) Filed: Jun. 26, 2013

(65) Prior Publication Data

US 2014/0002883 A1    Jan. 2, 2014

(30) Foreign Application Priority Data

Jun. 27, 2012    (KR) .................. 10-2012-0069267

(51) Int. Cl.
| | | |
|---|---|---|
| *G02F 1/155* | (2006.01) | |
| *G02F 1/157* | (2006.01) | |
| *G09G 3/38* | (2006.01) | |
| *B60R 1/08* | (2006.01) | |
| *G02F 1/15* | (2006.01) | |

(52) U.S. Cl.
CPC ........ *G02F 1/157* (2013.01); *G09G 3/38* (2013.01); *B60R 1/088* (2013.01); *B60R 1/085* (2013.01); *G02F 1/1508* (2013.01); *G02F 1/15* (2013.01); *G02F 1/1523* (2013.01); *G02F 1/155* (2013.01); *G02F 2001/1515* (2013.01); *G02F 2203/02* (2013.01)

(58) Field of Classification Search
CPC ........... G02F 1/15; G02F 1/155; G02F 1/157; G02F 1/1523; G02F 1/161; G02F 1/163; G02F 2001/1515; G02F 2203/02; G02F 1/1508; G02F 1/1521; G02F 2001/1552; G02F 2203/11; B60R 1/00; B60R 1/08; B60R 1/085; B60R 1/088; G09G 3/34; G09G 3/38; C09K 9/00; C09K 9/02
USPC ................................................ 359/265–275
See application file for complete search history.

(56) References Cited

U.S. PATENT DOCUMENTS

| | | | | |
|---|---|---|---|---|
| 5,274,493 A | * | 12/1993 | Couput et al. ................ | 359/275 |
| 6,452,711 B1 | | 9/2002 | Heuer et al. | |
| 7,351,460 B2 | * | 4/2008 | Kojima et al. .............. | 428/64.4 |
| 7,821,696 B2 | * | 10/2010 | Tonar et al. .................. | 359/267 |
| 2014/0085700 A1 | * | 3/2014 | Park ............................ | 359/272 |

FOREIGN PATENT DOCUMENTS

| | | |
|---|---|---|
| EP | 0897127 A2 | 2/1999 |
| KR | 10-2006-0092362 A | 8/2006 |

OTHER PUBLICATIONS

European Search Report dated Oct. 10, 2013 in European Application No. 13173879.

* cited by examiner

*Primary Examiner* — Loha Ben
(74) *Attorney, Agent, or Firm* — Saliwanchik, Lloyd & Eisenschenk

(57) ABSTRACT

Provided is an electrochromic device including: two substrates opposed to each other; an electrode and a conductive reflection layer interposed between the two substrates; a first electrochromic coating layer interposed between the electrode and the conductive reflection layer; and an electrolyte layer interposed between the first electrochromic coating layer and the conductive reflection layer, whereby uniform discoloration and decolorization can be performed, the efficiency of power consumption can be enhanced, and a durability of the device and the speed of a decolorization reaction can be improved.

10 Claims, 5 Drawing Sheets

ELECTROCHROMIC DEVICE

CROSS-REFERENCE TO RELATED APPLICATION

This application claims the benefit under 35 U.S.C. §119 of Korean Patent Application No. 10-2012-0069267, filed Jun. 27, 2012, which is hereby incorporated by reference in its entirety.

BACKGROUND

1. Field of the Invention

The present invention relates to an electrochromic device, more specifically, to an electrochromic device in which an electrochromic coating layer coated with an electrochromic material is formed so that uniform discoloration and decolorization can be performed.

2. Description of the Related Arts

Electrochromism is a phenomenon in which a color is reversibly changed by the direction of an electric field when a voltage is applied. An electrochromic material is a material, an optical property of which can be reversibly changed by an electrochemical redox reaction having the electrochromism property. The electrochromic material is not colored when an electrical signal is not applied from the outside, but it is colored when the electrical signal is applied. On the contrary to this, when the electrical signal is not applied from the outside, the electrochromic material is colored, but when the electrical signal is applied, the electrochromic material is not colored.

An electrochromic device, which is a device using a phenomenon in which the light transmission of an electrochromic material is changed by an electrochemical redox reaction, has been used for adjusting the light transmission or reflectance of a window glass for building or a mirror for automobiles. Recently, as the electrochromic device has been known to have an infrared cutoff effect as well as a color variation in a visible ray area, it has been receiving a great deal of attention with regard to the possibility of application as an energy-saving type product.

In particular, the electrochromic mirror (ECM) is a mirror for stably protecting a driver's field of vision by providing a variation in reflectance depending upon discoloration of the mirror at the same time as automatically sensing the strong beam of a car reflected from a car mirror in the daytime or at night.

FIG. 1 is a view schematically illustrating the structure of a conventional electrochromic device. Referring to the drawing, the conventional electrochromic device is configured such that a first substrate 10 and a second substrate 20 opposed to each other are disposed to be spaced apart from each other, an electrode 30 and a reflection layer 40 are formed on facing surfaces of the first and second transparent substrates 10, 20, respectively, a space is formed between the electrode 30 and the reflection layer 40 using a sealant 50, and an electrochromic material layer 60 is formed by injecting a liquid discoloration material and an electrolyte into the formed space. Also, first and second electrode connection units 70, 80 are provided on one end of the first substrate 10 and electrode 30, and one end of the second substrate 20 and the reflection layer 40, respectively. The conventional electrochromic device, particularly an electrochromic mirror, functions to protect a driver's field of vision by applying an electrochromic material in a liquid state to reduce the reflectance of light.

However, in order to maintain an electrochromic state of the electrochromic material in the liquid state, a voltage should be continuously applied. Thus, it is problematic in that high power consumption is required, and a reaction speed is slow upon decolorization. Furthermore, the electrochromic material in the liquid state is problematic in that uniform discoloration is not performed upon discoloration.

PRIOR ART REFERENCE

Patent Reference

Korean Laid-Open Patent Publication No. 10-2006-0092362

BRIEF SUMMARY

Accordingly, the present invention has been made keeping in mind the above problems occurring in the related art. An aspect of the present invention provides an electrochromic device, which is configured such that an electrochromic coating layer is formed by coating an electrochromic material on a substrate so that uniform discoloration and decolorization can be performed, and low power consumption and a rapid reaction speed can be realized.

According to an aspect of one embodiment of the present invention, there is provided an electrochromic device, including: two substrates opposed to each other; a electrode and a conductive reflection layer formed between the two substrates; a first electrochromic coating layer interposed between the electrode and the conductive reflection layer; and an electrolyte layer interposed between the first electrochromic coating layer and the conductive reflection layer.

In the electrochromic device according to another embodiment of the present invention, the electrochromic device may further include a second electrochromic coating layer coated with an electrochromic material and disposed between the electrolyte layer and the conductive reflection layer.

The advantageous effect according to the embodiments of the present invention is that the electrochromic coating layer coated with the electrochromic material is formed so that uniform discoloration and decolorization can be performed.

Also, Another advantageous effect according to the embodiments of the present invention is that since the electrochromic material has a memory effect, a voltage is applied only upon discoloration and decolorization, and thus low power consumption is required, and since a reverse voltage is applied upon decolorization, the speed of a decolorization reaction is fast.

Moreover, since the electrochromic material capable of applying a coating method is an inorganic or organic polymer, durability of the material is excellent.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
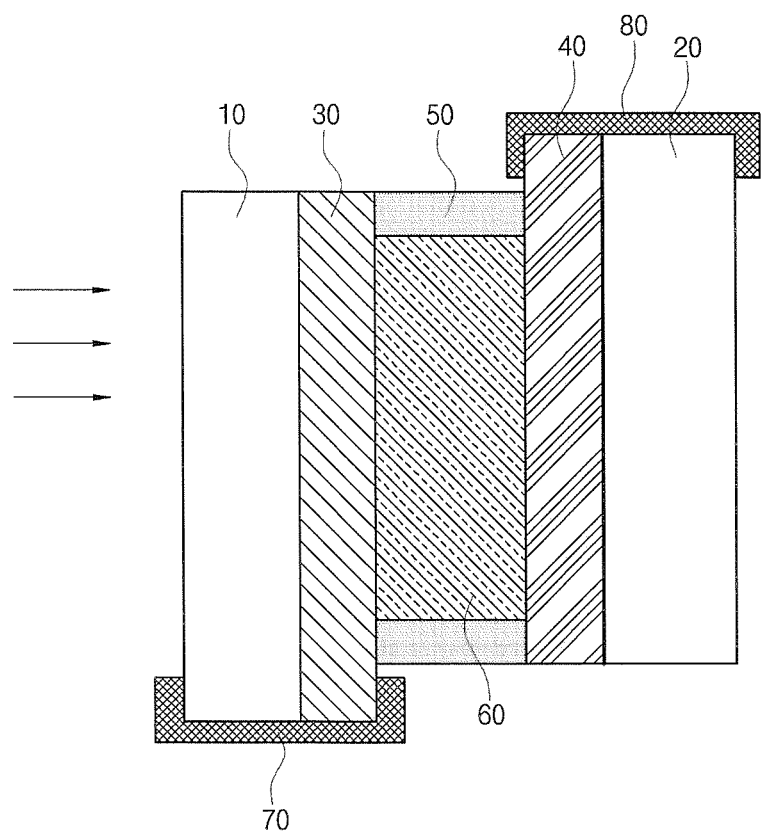
FIG. 1 is a view schematically illustrating the structure of a conventional electrochromic device.

Hereinafter, preferred embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted. Further, it should be understood that the shape and size of the elements shown in the drawings may be exaggeratedly drawn to provide an easily understood description of the structure of the present invention rather than reflecting the actual sizes of the corresponding elements.

The gist of the present invention is to provide an electrochromic device, which is configured such that an electrochromic coating layer is formed by coating an electrochromic material on a substrate so that uniform discoloration and decolorization can be performed, and low power consumption and the rapid speed of a decolorization reaction can be realized.

Figure 2:
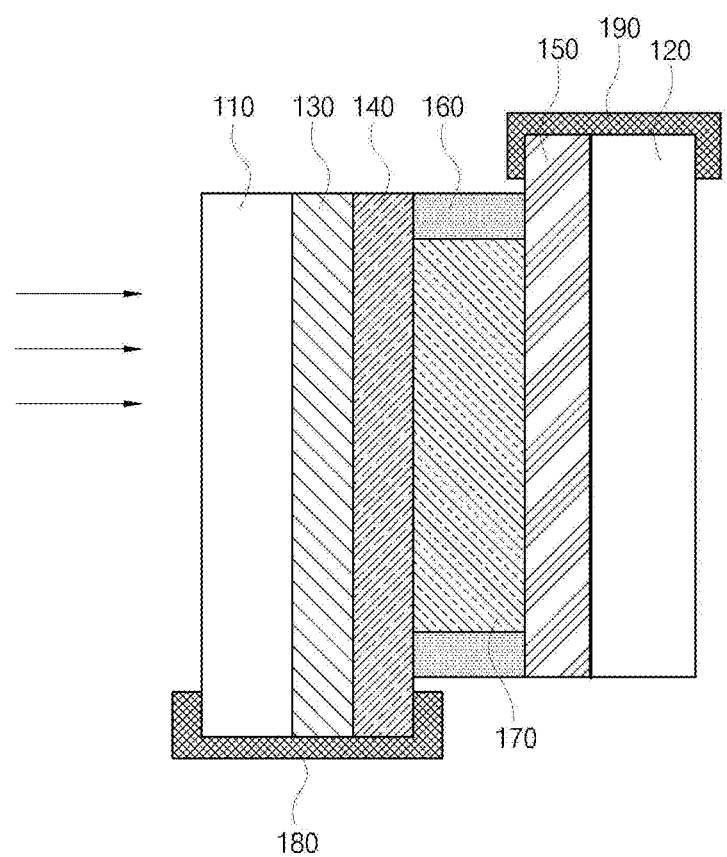
FIG. 2 is a view illustrating the structure of an electrochromic device according to one embodiment of the present invention.

FIG. 2 is a view illustrating the structure of an electrochromic device according to one embodiment of the present invention. Referring to the drawing, the electrochromic device according to the present embodiment of the invention may include: two substrates opposed to each other; an electrode and a conductive reflection layer interposed between the two substrates; and a first electrochromic coating layer interposed between the electrode and the conductive reflection layer. That is, the coated electrochromic coating layer is formed on the substrates so that uniform discoloration and decolorization can be performed, and low power consumption and a rapid reaction speed can be realized.

At least any one or all of the substrates may be formed of a transparent substrate. As an example, the present embodiment shows the case in which two substrates are all formed of transparent substrates.

The electrochromic device according to the present embodiment of the invention may include: a first substrate 110 and a second substrate 120 which are opposed to each other at a predetermined distance; an electrode 130 and a conductive reflection layer 150 which are formed on surfaces opposite to the first substrate 110 and the second substrate 110; a first electrochromic coating layer formed by coating an electrochromic material on a rear surface of the electrode 130, namely a surface opposite to the second substrate 120; and an electrolyte layer 170 interposed between the first electrochromic coating layer 140 and the conductive reflection layer 150.

The first and second substrates 110, 120 may be formed of transparent substrates, for example, preferably glass substrates, without being limited thereto. They may be composed of a transparent material such as silicone, synthetic resin, aerozol and the like.

The electrode 130 may be configured of a transparent electrode, and the first electrochromic coating layer may be formed by coating a material on a substrate on which the electrode is formed.

The electrode 130 formed on one surface of the first substrate 110, namely, the surface opposite to the second substrate 120, may be formed of a transparent electrode material.

As one example, the electrode 130 may composed of an ITO (Indium doped Tin Oxide), an AZO (Aluminum doped Zinc Oxide), a GZO (Galium doped Zinc Oxide), an ATO (Antimony doped Tin Oxide), an FTO (Fluorine doped Tin Oxide), an IZO (Indium doped Zinc Oxide), an NTO (Niobium doped Titanium Oxide), or ZnO. The conductive reflection layer 150, which performs the function of a relative electrode to the electrode 130, is formed on a surface opposite to the first substrate 110 of both surfaces of the second substrate 120.

The first electrochromic coating layer 140 is formed on a surface of the electrode 130 opposite to the second substrate 120 and the conductive reflection layer, namely, between the electrolyte layer 170 to be explained later and the electrode 130. The first electrochromic coating layer 140, which is a layer coated with the electrochromic material, may be an organic or inorganic electrochromic material. The organic electrochromic material may be composed of viologen, anthraquinone, polyaniline, polypyrrole or polythiophene, and the inorganic electrochromic material may be $WO_3$, $MoO_3$, $CeO_2$, $MnO_2$ or $Nb_2O_5$. In consideration of a reaction speed for discoloration and decolorization, it would be preferable that the first electrochromic coating layer 140 is the organic electrochromic material.

The conductive reflection layer 150 is formed on the second substrate 120, and serves as a reflection plate for reflecting light incident by passing through the first electrochromic coating layer 140, and as the relative electrode of the electrode 130. The conductive reflection layer 150 may be composed of at least one metal selected from the group consisting of Cu, Au, Ag, Ni, Al, Cr, Ru, Re, Pb, Sn, In and Zn, or an alloy thereof. This is only one example, but is not limited.

The electrolyte layer 170 is formed by injecting an electrolyte into a space between the conductive reflection layer 150 and the first electrochromic coating layer 140, a sealant 160 is provided on both ends of the electrolyte layer, and electrode connection units 180, 190 are provided on one end of the first substrate 110, electrode 130 and first electrochromic coating layer 140, and one end of the second substrate 120 and conductive reflection layer 150, respectively.

As the conventional electrochomic device has an electrochromic material in a liquid state, uniform discoloration is not performed. Furthermore, in order to maintain a discoloration state thereof, the voltage should be continuously applied, so high power consumption is required. However, in the electrochromic device according to the present embodiment of the invention, as described above, since the first electrochromic coating layer 140 is formed, uniform discoloration and decolorization can be performed, and since the electrochromic material has a memory effect, the voltage is applied only upon discoloration and decolorization, thereby enabling the power consumption to be reduced. Furthermore, since a backward voltage is applied upon the decolorization, the speed of a decolorization reaction is fast, and since the electrochromic material to which the coating method is applied is an inorganic or organic polymer, durability of the device is improved.

Figure 3:
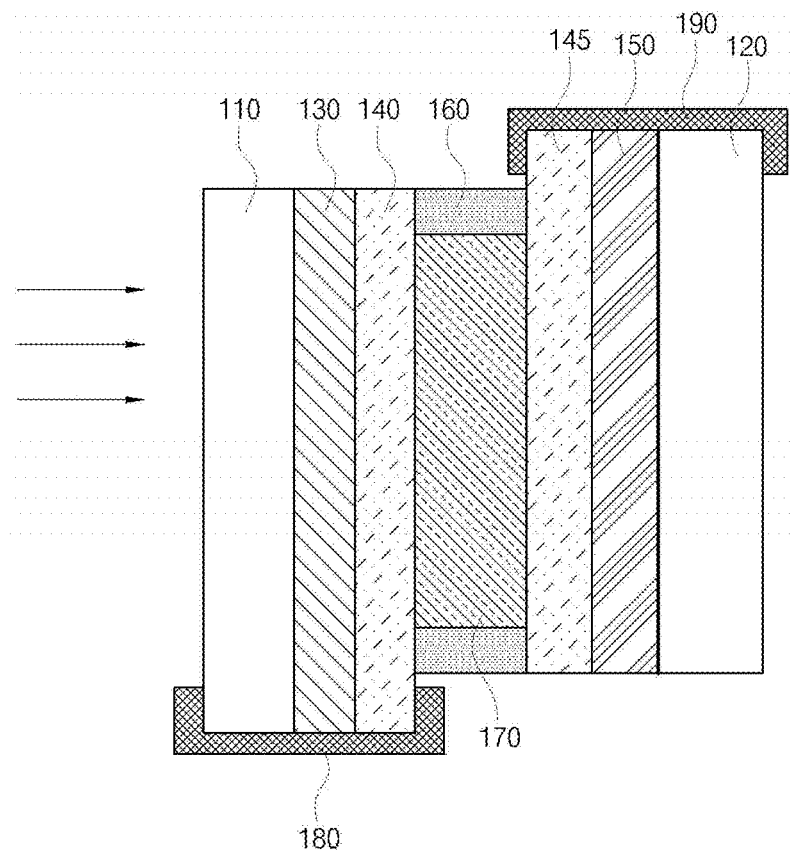
FIG. 3 is a view illustrating the structure of an electrochromic device according to another embodiment of the present invention.
Figure 4:
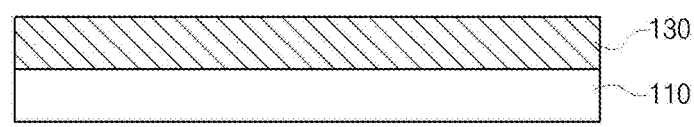
FIG. 4 through FIG. 9 are manufacture process views according to still another embodiment of the present invention.
Figure 5:
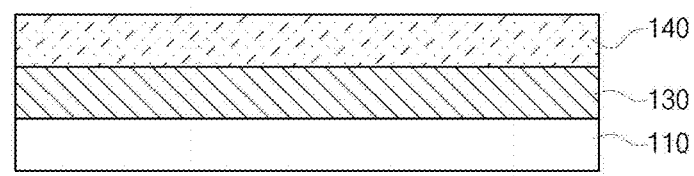
Figure 6:
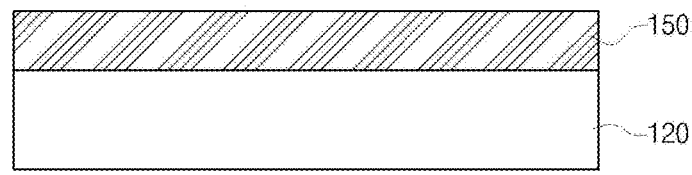
Figure 7:
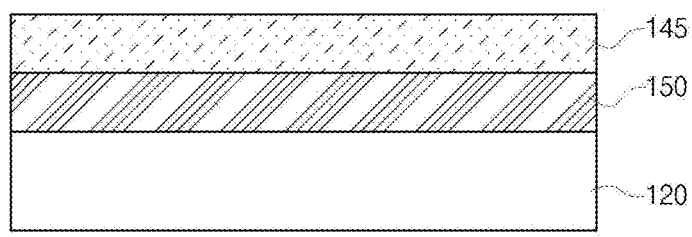
Figure 8:
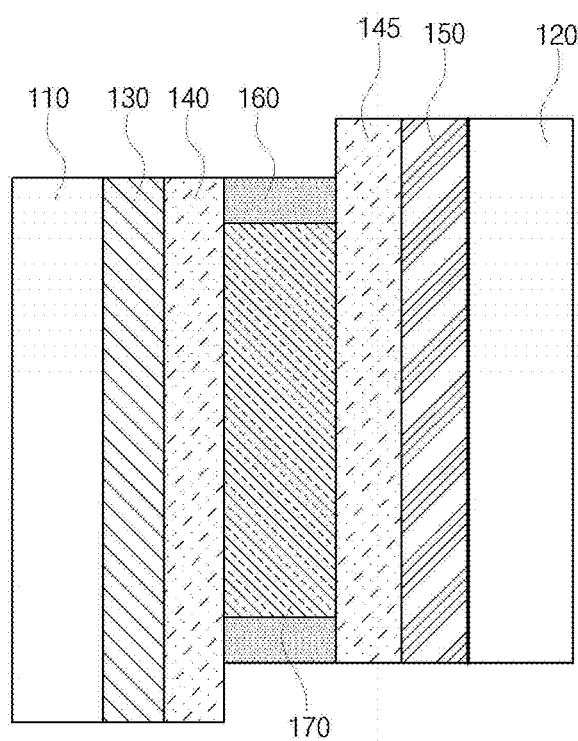
Figure 9:
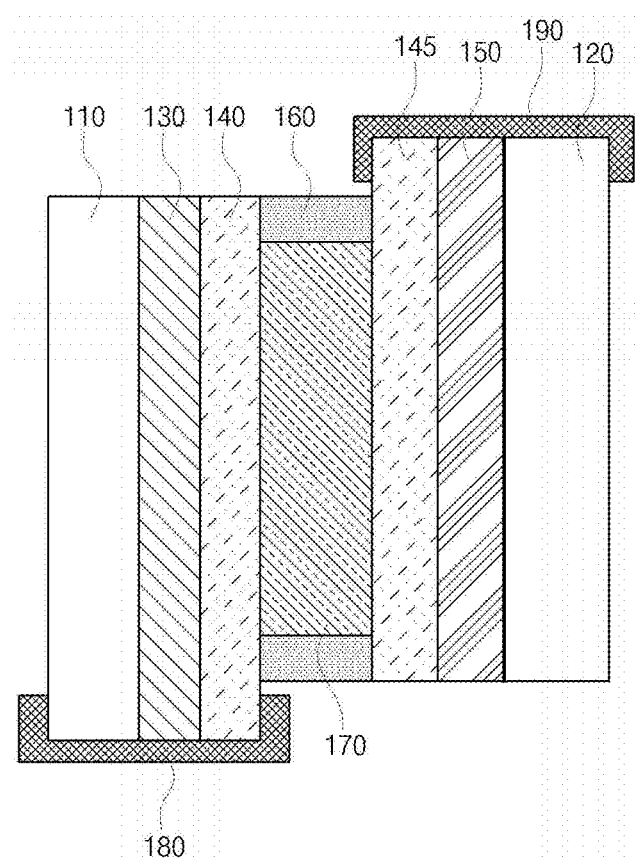

FIG. 3 is a view illustrating the structure of an electrochromic device according to another embodiment of the present invention. The electrochromic device according to the present embodiment of the invention has a similar structure to that of FIG. 2, but further includes a second electrochromic coating layer 145 formed between the electrolyte layer 170 and the conductive reflection layer 150.

FIG. 4 through FIG. 9 are manufacture process views according to still another embodiment of the present invention. Referring to the drawings, the electrode 130 is formed on the first substrate 110, namely, the surface opposite to the second substrate 120, and the first electrochromic coating layer 140 coated with the electrochromic material is formed on the electrode 130. The conductive reflection layer 150 is formed on the second substrate 120, namely, the surface opposite to the first substrate 110, and the second electrochromic coating layer 145 coated with the electrochromic material is formed on the conductive reflection layer 150. The first and second electrochromic coating layers 140, 145 may be formed using a deep coating method, a spray coating method or a spin coating method. In the present embodiment, the process for forming the second electrochromic coating layer 145 is included, but the electrochromic device may be produced by forming only the first electrochromic coating layer 140 without the forming of the second electrochromic coating layer 145. After this, a space is formed between the first and second electrochromic coating layers 140, 145 using the sealant 160, the electrolyte layer 170 is formed by injecting an electrolyte into the formed space, the electrode connection units 180 and 190 are formed on one end of the first substrate 110, electrode 130 and first electrochromic coating layer 140, and one end of the second substrate 120, conductive reflection layer 150 and second electrochromic coating layer 145, respectively, thereby manufacturing the electrochromic device.

The preferred embodiments are disclosed in the drawings and the specification. The specific terms used herein are for the purpose of describing particular embodiments only and are not intended to be limiting of example embodiments. Thus, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. An electrochromic device, comprising:
   only two substrates opposed to each other;
   an electrode and a conductive reflection layer formed between the two substrates;
   a first electrochromic coating layer interposed between the electrode and the conductive reflection layer;
   an electrolyte layer interposed between the first electrochromic coating layer and the conductive reflection layer; and
   a second electrochromic coating layer interposed between the electrolyte layer and the conductive reflection layer;
   wherein the first electrochromic coating layer is formed by coating a material on a first substrate of the two substrates wherein the electrode is formed on the first substrate, and the second electrochromic coating layer is formed by coating a material on a second substrate of the two substrates wherein the conductive reflection layer is formed on the second substrate.

2. The electrochromic device according to claim 1, wherein the coating material of the first electrochromic coating layer is an organic material or an inorganic material.

3. The electrochromic device according to claim 2, wherein the organic material comprises any one selected from the group consisting of viologen, anthraquinone, polyaniline, polypyrrole and polythiophene.

4. The electrochromic device according to claim 2, wherein the inorganic material comprises any one selected from the group consisting of WO3, MoO3, CeO2, MnO2 and Nb2O5.

5. The electrochromic device according to claim 1, wherein at least one of the two substrates is a transparent substrate.

6. The electrochromic device according to claim 5, wherein the conductive reflection layer comprises at least one metal selected from the group consisting of Cu, Au, Ag, Ni, Al, Cr, Ru, Re, Pb, Sn, In, and Zn, or an alloy thereof.

7. The electrochromic device according to claim 1, wherein the electrode formed on the first substrate is a transparent electrode.

8. The electrochromic device according to claim 7, wherein the electrode (130) is any one selected from the group consisting of an ITO (Indium doped Tin Oxide), an AZO (Aluminium doped Zinc Oxide), a GZO (Galium doped Zinc Oxide), an ATO (Antimony doped Tin Oxide), an FTO (Fluorine doped Tin Oxide), an IZO (Indium doped Zinc Oxide), an NTO (Niobium doped Titanium Oxide) and ZnO, and a combination thereof.

9. The electrochromic device according to claim 1, wherein the second electrochromic coating layer is formed of the same material as that of the first electrochromic coating layer.

10. The electrochromic device according to claim 1, further comprising an electrode connection part provided on one end of each of the two substrates.

* * * * *